United States Patent
Trias (10) Patent No.: US 10,594,136 B1
(45) Date of Patent: Mar. 17, 2020

(54) SYSTEM AND METHOD TO SIMULATE CONTROLS IN THE HOLOMORPHIC EMBEDDING LOADFLOW CALCULATION

(71) Applicant: Antonio Trias, Sant Cugat del Valles (ES)

(72) Inventor: Antonio Trias, Sant Cugat del Valles (ES)

( * ) Notice: Subject to any disclaimer, the term of this patent is extended or adjusted under 35 U.S.C. 154(b) by 817 days.

(21) Appl. No.: 15/173,706

(22) Filed: Jun. 5, 2016

Related U.S. Application Data

(60) Provisional application No. 62/289,369, filed on Feb. 1, 2016, provisional application No. 62/187,839, filed on Jul. 2, 2015.

(51) Int. Cl.
*G05B 17/02* (2006.01)
*G06F 17/11* (2006.01)
*H02J 3/00* (2006.01)

(52) U.S. Cl.
CPC ............... *H02J 3/00* (2013.01); *G05B 17/02* (2013.01); *G06F 17/11* (2013.01); *H02J 2003/007* (2013.01)

(58) Field of Classification Search
None
See application file for complete search history.

(56) References Cited

U.S. PATENT DOCUMENTS

| 2011/0257933 A1* | 10/2011 | Trias | G01R 21/00 702/182 |
| 2014/0156094 A1* | 6/2014 | Trias | G06F 17/50 700/291 |

OTHER PUBLICATIONS

Subramanian, M. K. (2014). Application of holomorphic embedding to the power-flow problem (Doctoral dissertation, Arizona State University) (Year: 2014).*

* cited by examiner

*Primary Examiner* — Bijan Mapar (57) ABSTRACT

A system and method is presented for enabling the simulation of smooth, unlimited controls in the Holomorphic Embedding Load-flow Method (HELM) for calculating power flows. These are controls that can be expressed as differentiable algebraic expressions of the voltages or power flows. The invention draws on the ability of HELM to turn the powerflow problem into a sequence of linear problems, as well as on the powerful physical intuition that is gained by the underlying methodology. The outcome is that any kind of smooth and unlimited control can be accommodated under the HELM method, preserving all its fundamental properties of reliability and determinism on the obtained solutions. One particularly interesting feature is the automatic treatment of conflicting and/or overlapping controls in an optimal way, via SVD techniques.

10 Claims, 3 Drawing Sheets

SYSTEM AND METHOD TO SIMULATE CONTROLS IN THE HOLOMORPHIC EMBEDDING LOADFLOW CALCULATION

CROSS REFERENCE TO RELATED APPLICATIONS

The present application claims the benefit of U.S. Patent Application Ser. No. 62/187,839 entitled "SYSTEM AND METHOD FOR OBTAINING THE POWERFLOW IN DC GRIDS WITH CONSTANT POWER LOADS AND DEVICES WITH ALGEBRAIC NONLINEARITIES", filed on Jul. 2, 2015, and U.S. Patent Application Ser. No. 62/289,369 entitled "SYSTEM AND METHOD TO SIMULATE CONTROLS IN THE HOLOMORPHIC EMBEDDING LOADFLOW CALCULATION", filed Feb. 1, 2016, the entire teachings of which are incorporated herein by reference.

BACKGROUND

Systems and methods herein generally relate to the problem of calculating powerflow studies of electrical networks, and more particularly to methods for incorporating and simulating the behavior of power system controls in those studies.

Powerflow studies need to incorporate the effects of several kinds of regulating devices that are always present in the operation of electrical networks. A non-exhaustive list of the most interesting ones, from the point of view of steady-state powerflow, comprises: voltage regulation by generators (AVR, Automatic Voltage Regulation) or by transformers (ULTC, Under-Load Tap Changers), real power regulation by phase shifters, reactive power regulation by transformers, and net real power regulation across tie lines (area interchange schedules). Additionally, controls may be local or remote. Some remote controls may be real, enabled by modern fast telecommunications; others are just convenient artifacts used in the context of planning studies. Whatever the case, a power flow method needs to incorporate all these types of control in order to be useful for real work.

Iterative powerflows use one of these two different general approaches: (a) integrating the additional equations and new control variables into the definition of the matrix of the method (possibly eliminating some variables if they are given directly by the control setpoints); (b) keeping the original equations and using an "outer loop" approach, whereby the control variables are adjusted in between iterations, in proportion to the residuals of the regulated magnitude. The proportionality coefficients for these adjustments, the so-called sensitivities, are obtained either by theoretical modeling, direct computation, or empirical tests. This option (b) is favored by methods that keep the Jacobian constant through the iterations, such as the FDLF method of Stott and Alsac, because it allows taking into account control limits on the fly. This, however, makes convergence behavior even harder to model and analyze. By contrast, the treatment of limits in method (a) requires a change in the equations (for instance, a PV to PQ type switch), so it would be more suited for a full NR method. Apart from the inherent problems of iterative load flow methods, the problem with both of these two approaches to the treatment of controls is that the unpredictable dynamics of the numerical iteration is never a good guide to select a solution when there are many possible saturated controls (as it is often the case in planning studies).

U.S. Pat. Nos. 7,519,506 and 7,979,239 to Trias take a very different approach. The method, from here onwards termed the Holomorphic Embedding Load-flow Method (HELM), is non-iterative, constructive, and takes advantage of the specific mathematical structure of the power flow problem by using techniques of Complex Analysis. However, the method, as disclosed there, focused on the fundamentals of the load flow calculation and only gave explicit implementation details for PQ buses, with no regulating devices. The innovation disclosed here extends the aforementioned method in order to contemplate control devices and correctly calculate the steady state solution of the network when they operate, all while preserving the nice deterministic properties of the base method.

SUMMARY

The method disclosed herein comprises a procedure for contemplating and correctly simulating the effect of control devices (also known as regulating devices) in the steady-state solution of an electrical power network. The present disclosure is framed under the general field of load-flow studies in power systems, and in particular it is based on the Holomorphic Embedding Load-flow Method (HELM), first described in U.S. Pat. Nos. 7,519,506 and 7,979,239. The method contemplates any general type of control device, as long as the corresponding constraint equations on the base load flow problem are smooth, and the control resource can be considered unlimited. By this it is meant that the controls should be such that they induce constraint equality equations that are complex-differentiable with respect to the voltages and power flows, and whose controlling variables are continuous and unbounded. The treatment of inequality constraints and limits is not contemplated in the innovation disclosed here, but it will be the specific subject of a separate application.

The innovation is inspired in the effective linearizing properties of the HELM method, whereby the original nonlinear problem is turned into an infinite sequence of chained linear systems. Exploitation of this key insight, together with the realization that smooth and unbounded controls result in additional holomorphic functions and constraint equations, yields a method in which some powerful tools of linear algebra can be put to good use. In particular, the method automatically defends against possible conflicts or overlaps among different controls, which would otherwise result in an over-determined or under-determined system (it achieves this through a technique based on the Singular Value Decomposition, SVD). This is a very common problem in large network models of transmission system operators, so in this sense the method provides an additional aspect of robustness on top of the reliability already provided by the base HELM method. It may potentially save the analyst a tremendous amount of the time cleaning the model from conflicting controls.

The systems and methods disclosed herein encompass the most general types of control devices. In such abstract formulation, there are many opportunities for simplification and performance optimization if one applies specialized treatment to the specific types of control devices that allow such thing. It is expected that any person skilled in the art will be able to arrive to similar useful particularizations of the general method disclosed here.

DETAILED DESCRIPTION

From the point of view of steady-state powerflows, controls are additional mathematical constraints on the variables. These constraints are either control setpoints or control ranges for some variables of the system. Although some controls may be specified in terms of flows, it is always possible to express them in terms of the ultimate variables of the system, the voltages. In turn, each constraint needs to introduce a corresponding controlling variable, in order to keep the number of equations and the number of degrees of freedom (i.e. the actual number of free variables) balanced. This could be for instance the reactive injection Q of a regulating generator, or the tap ratio a of a regulating transformer, or the weighed sum of real power outputs of designated generators for an area interchange schedule.

As it regards HELM, the key aspect is whether or not the constraint equations and the controlling variables are treated as continuous and smooth. Limits and discreteness cannot be directly accommodated by the holomorphic embedding methodology, because they make the constraint equations and/or the controlling variables non-differentiable, and therefore cannot be represented by holomorphic functions under any embedding. Thus, the problem of control limits and discretization of control resources is contemplated separately. Although this may sound like the "outer loop" approach of iterative powerflows, please note that it is not based on an iterative scheme. Rather, it consists in a guided optimization search, based on physical criteria that are derived from the HELM method. Here we confine ourselves to the problem of continuous, smooth (i.e. differentiable), and unbounded controls in HELM. Remarkably, these controls can be arbitrarily complex and non-local. Additionally, they may contain overlaps and conflicts and still be treated gracefully. All of this can be done while preserving the essential properties of HELM: the mathematical guarantee to give either the correct operational solution, or the infeasibility of the problem, in non-ambiguous terms.

The essence of the HELM method lies in leveraging the nice properties of complex analyticity (holomorphicity) in order to turn a nonlinear problem into a chained sequence of linear ones. This is one key insight that is exploited here in this invention. Let us first recall how the method works so that we can highlight this linearization more explicitly. Consider the power flow equations of a basic power system comprised of constant PQ power injections plus (optionally) constant current injection terms:

$$\sum_j Y_{ij} V_j(s) = I_i + \frac{S_i^*}{V_i^*} \qquad (1)$$

Figure 1:
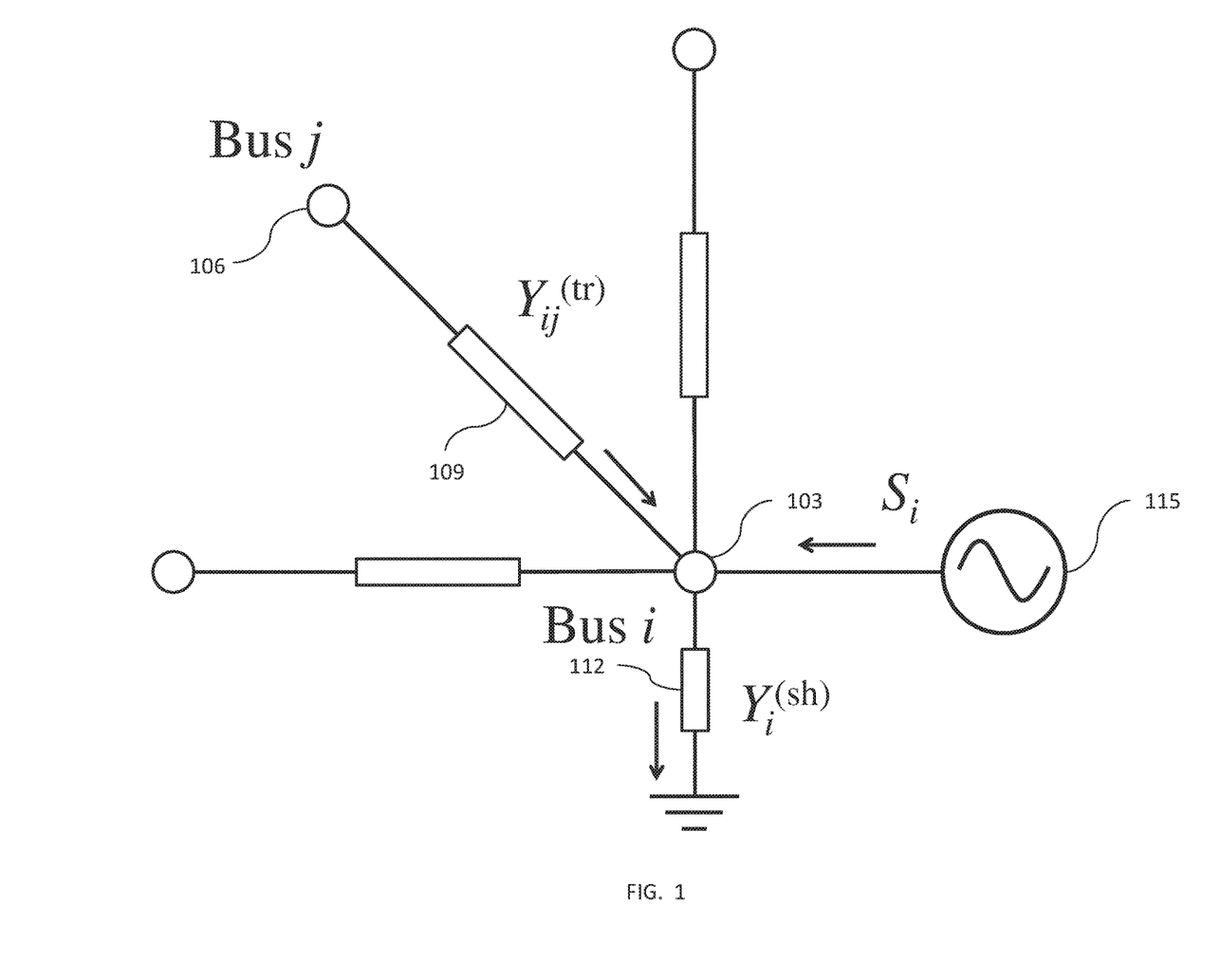
FIG. 1 is a schematic representation of a power network, displaying the sign conventions for voltage and power flow magnitudes as they are used in the description of the systems and methods herein.

The nomenclature and sign conventions used in the description of the systems and methods disclosed herein are depicted in FIG. 1. This schematic drawing illustrates a generic electric power network. Equation (1) holds for the voltage $V_i$ at each bus i 103, and the summation on the right hand side runs over all neighbor buses j 106, which are linked by transmission lines 109 having admittances $Y_{ij}^{(tr)}$ 109. For clarity, we are defining the admittance matrix $Y_{ij}$ to include the transmission terms $Y_{ij}^{(tr)}$ 109 and all possible shunt terms $Y_i^{(sh)}$ 112 (both from line susceptances and any other devices or load models). Each bus i 103 may also have constant current $I_i$ or constant power $S_i$ injections provided by a generator 115. Now consider these powerflow equations under the following simple embedding scheme:

$$\sum_j Y_{ij} V_j(s) = I_i + \frac{sS_i^*}{V_i^*(s^*)} \qquad (2)$$

We then introduce the following notation for the coefficients of the formal power series of $V_i(s)$ and $1/V_i(s)$:

$$V_i(s) = \sum_{k=0}^{\infty} V_i[k]s^k; \quad \frac{1}{V_i(s)} = \sum_{k=0}^{\infty} V_i^{-1}[k]s^k \qquad (3)$$

Substituting these in equation (2) and equating coefficients of the same order in s, we obtain, at order N:

$$\sum_j Y_{ij} V_j[N] = I_i \delta_{0,N} + S_i^* V_i^{-1*}[N-1] \qquad (4)$$

From here onward this will be termed the "representation at N-th order". Note that it is a linear system where all terms on the right hand side are known, as the coefficients $V_i^{-1*}[N-1]$ can be easily computed from all coefficients obtained at previous orders by means of simple convolution expressions:

$$\sum_{k=0}^{N} V_i[k] V_i^{-1}[N-k] = \delta_{0,N} \text{ for } N \geq 0 \qquad (5)$$

Therefor, equation (4) represents a sequence of linear systems that must be solved, order after order of the power series. The solution of the linear system at a given order N is used to compute the right hand side for the next linear system, at the following order N+1. The procedure can continue indefinitely, up to the order that makes sense, depending on machine precision and desired tolerances. The rest of the method just consists in computing the values of the power series at s=1 by means of Padé approximants, using the diagonal and sub/super-diagonal sequences of approximants in the Padé table.

It is in this sense that one can say that the method "linearizes" the powerflow (note, however, that there are no approximations involved here: by virtue of holomorphicity and Stahl's theorem, at the end of the procedure one obtains the exact solution, within machine precision). In the following it is disclosed how to exploit this linearization property to incorporate controls in the HELM method.

The preferred embodiment of the method presented here has the broadest application across different types of control devices: the treatment accommodates any type of control, regardless of its complexity or non-locality. Since the method successfully transforms the problem in such a way that it allows the use of common linear algebra techniques, it is straightforward for any person sufficiently skilled in the art to arrive to narrower, particularized variations of the method that exploit specific types of controls in order to achieve higher computational performance in those cases.

Consider the general powerflow problem holomorphically embedded as in equation (2). Controls induce a set of additional physical injections at one or more buses, which will be denoted by $J_k$:

$$\sum_j Y_{ij} V_j(s) = I_i + \frac{sS_i^*}{V_i^*(s^*)} + \sum_{k \in \{JSET\}} \delta_{i,bus(k)} J_k(s) \quad (6)$$

Here {JSET} is meant to represent the set of all controlling injections. The particular form of these controlling injections will depend on the type of control being considered in each case, and they are straightforward to arrive to by any person skilled in the art (for instance, the controlling injection for a PV-controlled bus is $-jQ/V^*$; the two controlling injections at each side of an under-load tap-changing transformer are $ja(a-1)V/X$ and $j(1-a)V/X$ respectively, etc.). Since we have indexed {JSET} independently of the buses, we will use the expression bus(k) to give the bus index on which the injection $J_k$ is applied. Note how we allow for possibly several injections on the same bus, which may occur if several control resources actuate on the same point.

More importantly, the injections are required to be holomorphic in the embedding parameter s, and moreover we require that they vanish at s=0 in order to have a well-defined reference state. The N-th order representation then becomes:

$$\sum_j Y_{ij} V_j[N] = \Re_i[N-1] + \sum_{k \in \{JSET\}} \delta_{i,bus(k)} J_k[N] \quad (7)$$

where we have introduced the notation $\Re_i[N-1]$ to gather all remaining terms that depend on power series coefficients of orders N−1 and lower, which are available from solving previous steps:

$$\Re_i[N-1] = I_i \delta_{0,N} + S_i^* V_i^{-1*}[N-1] \quad (8)$$

However, not all these injections are necessarily independent. Many times, several of them depend on a common control resource, so that the actual number of new independent variables is in general less than {JSET}. For instance, a typical regulating transformer induces two new injections (one on each terminal), but they both depend on just one variable, the tap ratio. Likewise, shared-responsibility voltage control of a remote busbar entails as many injections as participants, but there is only one true degree of freedom, which is given by their total reactive injection. It is therefore important to correctly identify these ultimately independent variables, and verify that their number matches the number of constraint equations. Let us denote these variables by $I_g$, with g=1, . . . , C and C the number of constraints. The method only requires that the functional relationship between the physical injections $J_k$ and the mathematical variables $I_g$ is also smooth (holomorphic), so that one may develop the expressions in power series and arrive to their N-th order representation:

$$J_k[N] = \sum_{g=1}^{C} \lambda_{kg} I_g[N] + \Im_k[N-1] \quad (9)$$

where $\Im_k[N-1]$ gathers all terms of order N−1 and lower, and $\lambda_{kg}$ are complex coefficients that do not depend on N. All types of control fulfill this requirement when they are expressed as differentiable functions. As an example, consider the voltage control of a remote busbar by means of several generators, each supplying a prescribed share $\alpha_k$ of the total reactive injection. Each injection is then of the form:

$$J_k(s) = \frac{-jQ_{bus(k)}(s)}{V_{bus(k)}^*(s^*)} = \frac{-j\alpha_k I_{g_0}(s)}{V_{bus(k)}^*(s^*)} \quad (10)$$

where $I_{g_0}(s) = \Sigma_k Q_{bus(k)}$ is the actual degree of freedom (the sum here is over all buses involved in this control $g_0$). The N-th order representation for this example becomes:

$$J_k[N] = -j\alpha_k I_{g_0}[N] V_{bus(k)}^{-1*}[0] - j\alpha_k \sum_{n=1}^{N-1} I_{g_0}[n] V_{bus(k)}^{-1*}[N-n] \quad (11)$$

Here, in equation (11), we have made use of $I_{g_0}(0)=0$, as implied by our requirement that $J_g(0)=0$. This readily gives the values of $\lambda_{kg}$ and $\Im_k$ in equation (9) for this example.

Let us now turn to the constraints implied by the controls. The method only requires that the C constraint equations are general smooth expressions, so that they can be embedded holomorphically:

$$f_c(s, V(s), J(s)) = 0 \quad (12)$$

Most constraints are specified as setpoints on voltages or flows (which can ultimately be expressed in terms of voltages), but here we are also allowing them to be specified in terms of the controlling injections because this provides a useful simplification for some types of control. Additionally, and consistently with our choice $J_k(0)=0$ above, the method requires that the embedding of the constraints is designed such that at s=0 they are trivially satisfied by the reference solution $V_i(0)$.

Plugging the power series of V(s) and J(s) into the constraint equations (12), it is always possible to arrive to the following set of C linear equations in the N-th order representation:

$$\sum_{l \in \{VSET\}} E_{cl} V_l[N] + \sum_{k \in \{JSET\}} F_{ck} J_k[N] = \mathfrak{E}_c[N-1] \quad (13)$$

where {VSET} is the set of voltages that appear in some constraint equation (the ones actually having contributions appearing at N-th order), $E_{cl}$ and $F_{ck}$ are constants, and $\mathfrak{E}_c[N-1]$ gathers all lower order coefficients. As an example, consider again the case of a remote voltage control, as before. Assuming the regulated bus is $i_0$, this constraint is simply expressed as $V_{i_0} V_{i_0}^* = V_{(sp)}^2$. The simplest and most reasonable choice for the holomorphic embedding of this equation, compatible with all the aforementioned requirements, is a linear function interpolating the voltage between its known value at s=0 and the desired setpoint $V^2_{(sp)}$ at s=1:

$$V_k(s) V_k^*(s^*) = V_k(0) V_k^*(0) + s(V_{(sp)}^2 - V_k(0) V_k^*(0)) \quad (14)$$

Calculating the N-th representation for this equation readily allows to identify the constants $E_{cl}$ and the tail $\mathfrak{E}_c[N-1]$ in the general equation (13) above:

$$V_k[N]V_k^*[0] + V_k[0]V_k^*[N] = \tag{15}$$

$$(V_{(sp)}^2 - V_k[0]V_k^*[0])\delta_{N,1} - \sum_{n=1}^{N-1} V_k[n]V_k^*[N-n]$$

There is one subtle point that should be clarified before moving on, which concerns the actual number of independent variables and equations when working with complex numbers. In complex arithmetic, each complex variable contains two independent variables, and a formal equation is usually two equations when decomposed into its real and imaginary parts (or, equivalently, taking the complex conjugate of both sides). However, some equations, such as (15) above, may actually represent just one, not two equations (which can be seen because taking complex conjugates leaves the equation invariant). In our notation, the original powerflow equations (1) contain n complex voltages, therefore $2n$ unknown variables (n being the total number of buses, without counting swings). However, without loss of generality, we will assume that each of the constraint equations $f_c$ and each independent mathematical variable $I_g$ refer to just one effective degree of freedom, not two. In other words, $I_g$ will be considered real, and the equations $f_c$ will be invariant under complex conjugation. In fact, it is rare to see an example of a real-life control that can be expressed as a proper complex control injection plus a proper complex constraint equation. If there is one, we will assume it is expressed as two equations and two injections, for the purposes of exemplifying the method here.

Substituting the value of the physical injections, equation (9), into equations (7) and (13) results in an augmented linear system containing 2n+C equations and 2n+C unknowns (following the counting criterion explained above). Solving this linear system sequentially order after order, using sparse linear algebra solvers, yields the coefficients of the power series expansion of the voltages V(s), and therefore the final solution. Following the HELM method, this is achieved by calculating the sequence of diagonal and sub/super-diagonal Padé Approximants in the Padé table, and stopping when some prescribed numerical tolerance is reached.

However the method can be improved further, not just for performance reasons but because there is an opportunity to deal with potential conflicts among controls in an elegant and automatic manner. For a simple example, consider two different remote controls acting on the same busbar and having a different setpoint. This sort of conflict generates singularities in the augmented linear system shown above, which would require the user to manually find and correct such conflict before being able to continue with the calculation. This is automatically handled in an optimal way with the additional procedure that follows.

In essence, we will again exploit the linear nature of the systems in the N-th order representation, first using a block Gaussian elimination technique to solve the original powerflow subsystem separately from the constraint subsystem, and then applying the Singular Value Decomposition (SVD) to solve the constraint subsystem in order to deal with control conflicts.

Let us introduce the impedance matrix Z, the inverse of the admittance matrix Y:

$$\sum_n Z_{in}Y_{nj} = \sum_n Y_{in}Z_{nj} = \delta_{ij} \tag{16}$$

Let us now perform a block Gaussian elimination by solving from equation (7) those voltages involved in the {VSET}, in terms of the rest of the variables:

$$V_l[N] = \sum_n Z_{ln}\mathfrak{R}_n[N-1] + \sum_{k \in \{JSET\}} Z_{l,bus(k)}J_k[N] \tag{17}$$

These can be then substituted into the constraint equations (13):

$$\sum_{k \in \{JSET\}}\left(F_{ck} + \sum_{l \in \{VSET\}} E_{cl}Z_{l,bus(k)}\right)J_k[N] = \tag{18}$$

$$\mathfrak{C}_c[N-1] - \sum_{l \in \{VSET\}} E_{cl}\sum_n Z_{ln}\mathfrak{R}_n[N-1]$$

Substituting now the value of the injections from equation (9), we obtain:

$$\sum_{g=1}^{C}\sum_{k \in \{JSET\}}\left(F_{ck} + \sum_{l \in \{VSET\}} E_{cl}Z_{l,bus(k)}\right)\lambda_{kg}I_g[N] = \tag{19}$$

$$\mathfrak{C}_c[N-1] - \sum_{l \in \{VSET\}} E_{cl}\sum_n Z_{ln}\mathfrak{R}_n[N-1] -$$

$$\sum_{k \in \{JSET\}}\left(F_{ck} + \sum_{l \in \{VSET\}} E_{cl}Z_{l,bus(k)}\right)\mathfrak{I}_k[N-1]$$

The terms involving the inverse Z entail solving a linear system. There are two of these; let us make them more explicit. In the first case, let us define:

$$\lambda_l^{(g)} \equiv \sum_{k \in \{JSET\}} Z_{l,bus(k)}\lambda_{kg} \tag{20}$$

in order to obtain the following linear system:

$$\sum_n Y_{in}\lambda_l^{(g)} = \sum_{k \in \{JSET\}} \delta_{i,bus(k)}\lambda_{kg} \tag{21}$$

Note that this needs to be solved just once during the whole procedure. For the second system, let us define:

$$X_l[N] \equiv \sum_n Z_{ln}\mathfrak{R}_n[N-1] + \sum_{k \in \{JSET\}} Z_{l,bus(k)}\mathfrak{I}_k[N-1] \tag{22}$$

Then the following system must be solved, at each order in the procedure:

$$\sum_n Y_{in}X_n[N] = \mathfrak{R}_i[N-1] + \sum_{k \in \{JSET\}} \delta_{i,bus(k)}\mathfrak{I}_k[N-1] \tag{23}$$

Once these two systems are solved, one finally obtains a linear system for the mathematical injections $I_g$:

$$\sum_{g=1}^{C} H_{cg} I_g[N] = \mathfrak{C}_c[N-1] - \sum_{l \in \{VSET\}} E_{cl} X_l[N] - \sum_{k \in \{JSET\}} F_{ck} \mathfrak{J}_k[N-1] \quad (24)$$

where H is a matrix with dimensions C×C, given by:

$$H_{cg} \equiv \sum_{k \in \{JSET\}} F_{ck} \lambda_{kg} + \sum_{l \in \{VSET\}} E_{cl} \lambda_l^{(g)} \quad (25)$$

At each order N, solving the linear system given by equation (24) for the mathematical injections $I_g[N]$ allows one to compute the physical injections $J_k[N]$ using equation (9), and then finally solve equations (7) for the voltage coefficients $V_j[N]$. Crucially, the solution of equation (24) needs to be done via the Singular Value Decomposition (SVD) technique, instead of using an LU or Choleski factorization (the solution of equation (24) via SVD yields the vector $I_g[N]$ that minimizes the equations in the least-squares sense, otherwise known as the minimum Euclidean norm solution). This is because conflicting controls make the H matrix rank-deficient. By solving the augmented system via this block-Gaussian elimination procedure, the effect of conflicting controls has been isolated to the subsystem given by matrix H, instead of polluting the whole augmented linear system. This not only provides an elegant method to deal automatically and optimally with conflicting controls specified by a user; it also provides a way to detect the source of those conflicts by inspecting the singular vectors associated with zero and near-zero singular values of matrix H. This by-product of the calculation can then be used to provide the user with useful diagnostic information to cleanse the network model from those mistakes. This concludes the exemplification of the preferred embodiment of the method disclosed here.

Figure 2:
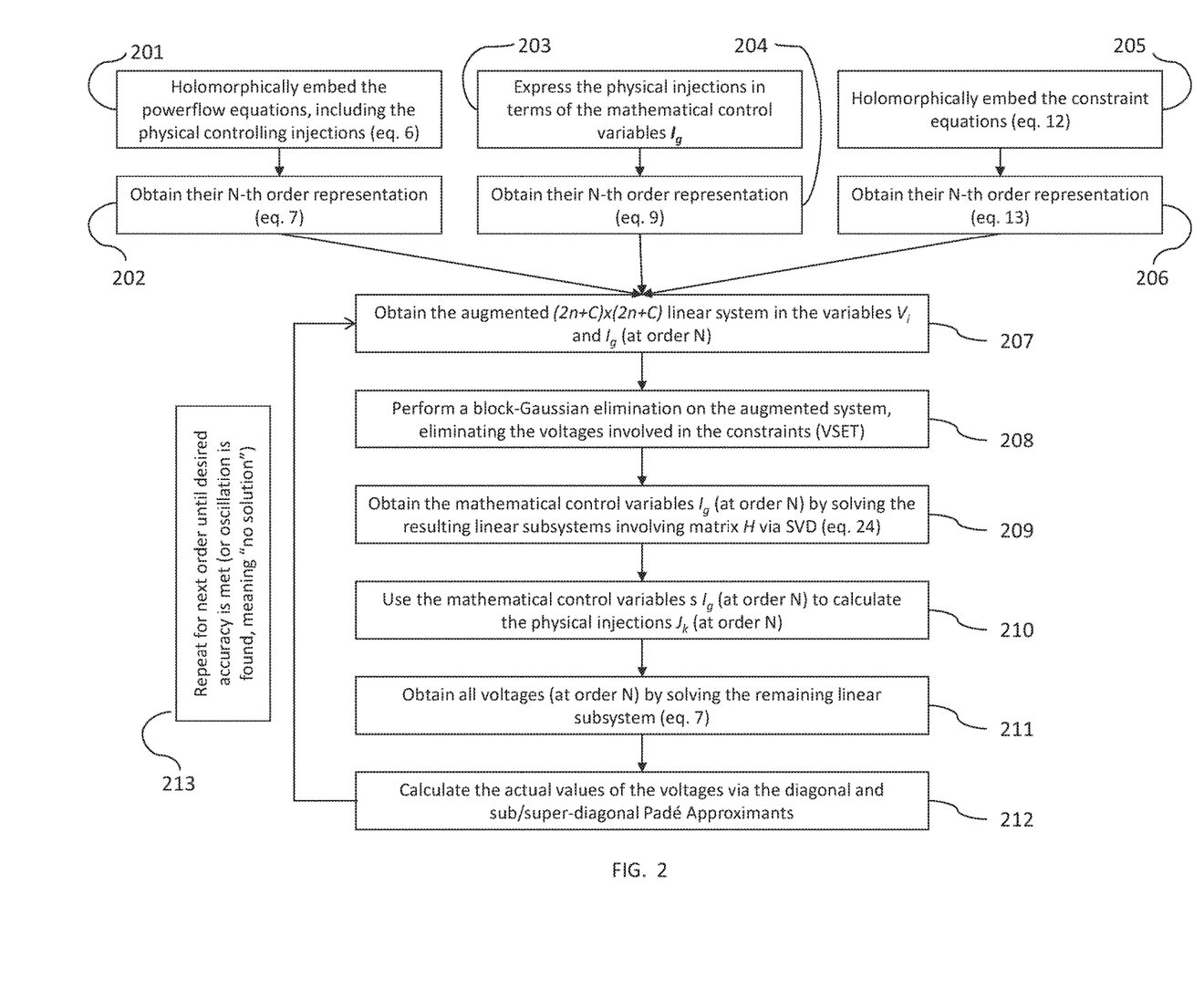
FIG. 2 is a flow diagram illustrating systems and methods herein.

A flow chart summarizing the steps of the procedure disclosed herein is depicted in FIG. 2. The method begins by holomorphically embedding the powerflow equations (6) including the physical controlling injections (step 201), and obtaining their N-th order representation, equation (7) (step 202). Similarly and in parallel, the constraint equations (12) are holomorphically embedded (step 205) and their N-th order representation, equation (13), is obtained (step 206). In parallel with all the above, the physical injections $J_k$ are expressed as a function of the underlying mathematical control variables $I_g$ (step 203), and then their N-th order representation, equation (9), is obtained (step 204). Steps 202, 204, and 206 now allow constructing the augmented linear system in the variables $V_j$ and $I_g$, at order N (step 207). The system may now be solved as it stands, but the method includes further steps in order to treat conflicting controls properly in an automated way. The treatment begins by performing a block Gaussian elimination of the voltages involved in the constraint equations, VSET (step 208). Then the resulting linear subsystems involving matrix H are solved in order to obtain the mathematical control variables $I_g$ at order N, via a SVD procedure (step 209). Once these are obtained, the physical injections $J_k$ (at order N) can be calculated from their definition, equation (9) (step 210).

Next, all voltages can be obtained now by solving the remaining linear subsystem, equation (7) (step 211). Finally, the actual values of the voltages are computed as prescribed by the general HELM method: use all power coefficients obtained up to order N to construct the diagonal and sub/super-diagonal Padé Approximants evaluated at s=1 (step 212), and check for accuracy in the original powerflow equations. Repeat the procedure for the next order in N until the desired accuracy is met, or until oscillation is found in the Padé sequence, which would mean that there is no solution (step 213).

Figure 3:
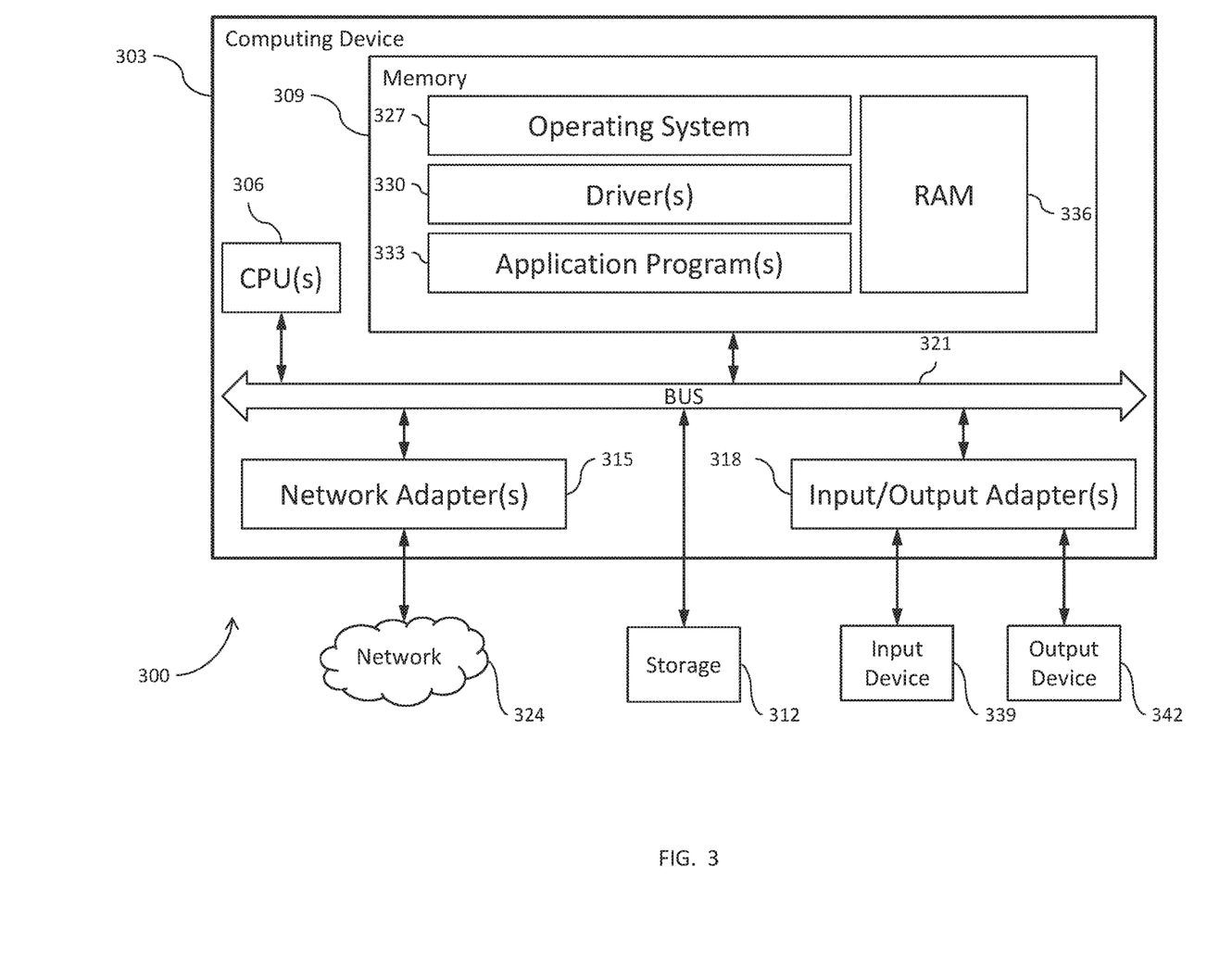
FIG. 3 is a schematic diagram of a hardware system according to systems and methods herein.

A representative hardware environment for practicing the systems and methods described herein is depicted in FIG. 3. This schematic drawing illustrates a hardware configuration of an information handling/computing system 300 in accordance with systems and methods herein. The computing system 300 comprises a computing device 303 having at least one processor or central processing unit (CPU) 306, internal memory 309, storage 312, one or more network adapters 315, and one or more input/output adapters 318. A system bus 321 connects the CPU 306 to various devices such as the internal memory 309, which may comprise random access memory (RAM) and/or read-only memory (ROM), the storage 312, which may comprise magnetic disk drives, optical disk drives, a tape drive, etc., the one or more network adapters 315, and the one or more input/output adapters 318. Various structures and/or buffers (not shown) may reside in the internal memory 309 or may be located in a storage unit separate from the internal memory 309.

The one or more network adapters 315 may include a network interface card such as a LAN card, a modem, or the like to connect the system bus 321 to a network 324, such as the Internet. The network 324 may comprise a data processing network. The one or more network adapters 315 perform communication processing via the network 324.

The internal memory 309 stores an appropriate Operating System 327, and may include one or more drivers 330 (e.g., storage drivers or network drivers). The internal memory 309 may also store one or more application programs 333 and include a section of Random Access Memory (RAM) 336. The Operating System 327 controls transmitting and retrieving packets from remote computing devices (e.g., host computers, storage systems, SCADA, etc.) over the network 324. In some systems and methods, the Supervisory and Data Acquisition Systems and/or Energy Management Systems may connect to the computing system 300 over the network 324. The drivers 330 execute in the internal memory 309 and may include specific commands for the network adapter 315 to communicate over the network 324. Each network adapter 315 or driver 330 may implement logic to process packets, such as a transport protocol layer to process the content of messages included in the packets that are wrapped in a transport layer, such as Transmission Control Protocol (TCP) and/or Internet Protocol (IP).

The storage 312 may comprise an internal storage device or an attached or network accessible storage. Storage 312 may include disk units and tape drives, or other program storage devices that are readable by the system. A removable medium, such as a magnetic disk, an optical disk, a magneto-optical disk, a semiconductor memory, or the like, may be installed on the storage 312, as necessary, so that a computer program read therefrom may be installed into the internal memory 309, as necessary. Programs in the storage 312 may be loaded into the internal memory 309 and executed by the CPU 306. The Operating System 327 can read the instructions on the program storage devices and follow these instructions to execute the methodology herein.

The input/output adapter 318 can connect to peripheral devices, such as input device 739 to provide user input to the CPU 306. The input device 339 may include a keyboard, mouse, pen-stylus, microphone, touch sensitive display screen, or any other suitable user interface mechanism to gather user input. An output device 342 can also be connected to the input/output adapter 318, and is capable of rendering information transferred from the CPU 306, or other component. The output device 342 may include a display monitor (such as a Cathode Ray Tube (CRT), a Liquid Crystal Display (LCD), or the like), printer, speaker, etc.

The computing system 700 may comprise any suitable computing device 303, such as a mainframe, server, personal computer, workstation, laptop, handheld computer, telephony device, network appliance, virtualization device, storage controller, etc. Any suitable CPU 306 and Operating System 327 may be used. Application Programs 333 and data in the internal memory 309 may be swapped into storage 312 as part of memory management operations.

It is expected that any person skilled in the art can implement the disclosed procedure using a computer program. The computer program may include instructions that would be provided to a processor of a general purpose computer, special purpose computer, or other programmable data processing apparatus to produce a machine, such that the instructions that execute via the processor of the computer or other programmable data processing apparatus obtain and plot different sets of sigma indices for a given network model under various realizations of the load, generation, and other parameters. The generalization of the example charts shown above to any other graphical representation of these indices should be evident to any person skilled in the art.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read-Only Memory (ROM), an Erasable Programmable Read-Only Memory (EPROM or Flash memory), an optical fiber, a magnetic storage device, a portable compact disc Read-Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language, such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The concepts herein have been described with references to specific systems and methods. While particular values, relationships, materials and steps have been set forth for purposes of describing such concepts, it will be appreciated by persons skilled in the art that numerous variations and/or modifications may be made to the systems and methods as shown in the disclosure without departing from the spirit or scope of the basic concepts and operating principles as broadly described. It should be recognized that, in the light of the above teachings, those skilled in the art could modify those specifics without departing from the concepts taught herein. Having now fully set forth certain systems and methods, and modifications of the concepts underlying them, various other systems and methods, as well as potential variations and modifications of the systems and methods shown and described herein, will obviously occur to those skilled in the art upon becoming familiar with such underlying concept. It is intended to include all such modifications and alternatives insofar as they come within the scope of the appended claims or equivalents thereof. It should be understood, therefore, that the concepts disclosed might be practiced otherwise than as specifically set forth herein. Consequently, the present systems and methods are to be considered in all respects as illustrative and not restrictive.

The invention claimed is:

1. A method, comprising:
holomorphically embedding powerflow equations for an electrical grid, wherein the powerflow equations include physical controlling injections;
obtaining an N-th order representation of the holomorphic embedding of the powerflow equations;
holomorphically embedding constraint equations, wherein constraints are associated with controls on the electrical grid;
obtaining an N-th order representation of the constraint equations;
expressing physical injections $J_k$ as a function of underlying mathematical control variables $I_g$;
obtaining an N-th order representation of the mathematical control variables $I_g$;
constructing an augmented linear system in the variables for voltage ($V_i$) and control ($I_g$) by substituting the value of the physical injections into the powerflow equations and the constraint equations, at order N;
evaluating the augmented linear system at order N to provide a solution to the powerflow equations; and
displaying the solution to the powerflow equations as a measure of control of the electrical grid.

2. The method of claim 1, further comprising:
prior to said holomorphically embedding said powerflow equations, receiving data from a supervisory and data acquisition system, wherein the data is representative of conditions of the electrical grid associated with said powerflow equations.

3. The method of claim 1, further comprising:
computing values of the augmented linear system by means of Padé approximants, using diagonal and sub/super-diagonal sequences of approximants in the Padé table.

4. The method of claim 1, wherein said physical controlling injections induce a set of additional physical injections at one or more buses of an electrical grid associated with said powerflow equations.

5. The method of claim 1, further comprising:
performing a block Gaussian elimination of voltages involved in the constraint equations.

6. The method of claim 5, further comprising:
constructing a matrix H with dimensions C×C, wherein C is the number of constraints associated with controls on the electrical grid and the matrix H represents the augmented linear system; and
solving the resulting linear subsystems involving matrix H and obtaining the mathematical control variables $I_g$ at order N, via a Singular Value Decomposition (SVD) procedure.

7. The method of claim 6, further comprising:
determining values for physical injections $J_k$, at order N, from their definition.

8. The method of claim 7, further comprising:
obtaining voltages for the powerflow equations by solving the remaining linear subsystem equations.

9. The method of claim 8, further comprising:
determining values of the voltages by using all power coefficients obtained up to order N to construct the diagonal and sub/super-diagonal Padé Approximants.

10. The method of claim 9, further comprising:
determining values of the voltages for the next order in N until desired accuracy is met, or until oscillation is found in the Padé Approximants.

* * * * *